US008267573B2

(12) United States Patent
Wilson

(10) Patent No.: US 8,267,573 B2
(45) Date of Patent: Sep. 18, 2012

(54) FOOD MIXER BLADES WITH INSERTS

(76) Inventor: Ian G. Wilson, Cheltenham (AU)

( * ) Notice: Subject to any disclaimer, the term of this patent is extended or adjusted under 35 U.S.C. 154(b) by 919 days.

(21) Appl. No.: 11/527,661

(22) Filed: Sep. 22, 2006

(65) Prior Publication Data

US 2007/0064523 A1  Mar. 22, 2007

Related U.S. Application Data

(63) Continuation of application No. PCT/AU2005/000398, filed on Mar. 22, 2005.

(30) Foreign Application Priority Data

Mar. 24, 2004  (AU) ................................. 2004901553

(51) Int. Cl.
*A47J 43/07* (2006.01)

(52) U.S. Cl. ....................... 366/200; 366/301; 366/328.3

(58) Field of Classification Search .................. 366/300, 366/301, 325.9, 325.93, 328.4, 309–313, 366/129, 344, 288, 197–207, 222–224, 328.1–328.3; 416/231 R, 231 A, 231 B See application file for complete search history.

(56) References Cited

U.S. PATENT DOCUMENTS

| | | | | |
|---|---|---|---|---|
| 20,804 A * | 7/1858 | MacNish | ....................... | 366/296 |
| 60,330 A * | 12/1866 | Brand et al. | ................... | 366/312 |
| 88,320 A * | 3/1869 | Miller | ........................... | 366/301 |
| 122,505 A * | 1/1872 | Wells | ............................. | 366/307 |
| 140,891 A * | 7/1873 | Condon | ........................ | 366/296 |
| 229,372 A * | 6/1880 | Brown | ............................. | 415/8 |
| RE9,615 E * | 3/1881 | Condon | ........................ | 416/78 |
| 410,356 A * | 9/1889 | Fakes | .............................. | 99/459 |
| 512,354 A * | 1/1894 | Bangert | ....................... | 366/192 |
| 826,839 A * | 7/1906 | Fay | ................................ | 261/32 |
| 849,273 A * | 4/1907 | Schuirmann et al. | ......... | 366/300 |
| 877,066 A * | 1/1908 | Fay | ................................ | 261/32 |
| 902,577 A * | 11/1908 | Hall | ............................... | 99/513 |
| 969,018 A * | 8/1910 | Willmann | .................. | 165/109.1 |
| 1,390,343 A * | 9/1921 | Disbrow | ...................... | 366/130 |
| 1,430,704 A * | 10/1922 | Wadsworth | .................. | 366/223 |
| 1,483,551 A * | 2/1924 | Mosher | ........................ | 366/300 |
| 1,723,620 A * | 8/1929 | Hottmann | .................... | 366/300 |
| 1,739,149 A * | 12/1929 | Heim | ......................... | 366/155.1 |
| 1,853,997 A * | 4/1932 | Robinson | ..................... | 366/309 |
| 1,859,226 A * | 5/1932 | Vosbikian et al. | ............... | 30/172 |
| 1,898,945 A * | 2/1933 | Fitzgerald | ...................... | 279/22 |
| 1,984,557 A * | 12/1934 | Werner | .......................... | 416/75 |
| 2,027,756 A * | 1/1936 | Tay | ................................ | 366/195 |
| 2,042,791 A * | 6/1936 | Martinet | .................... | 366/325.8 |
| 2,093,534 A * | 9/1937 | Wright | .......................... | 366/344 |
| 2,178,269 A * | 10/1939 | Seybert | ........................ | 366/313 |

(Continued)

FOREIGN PATENT DOCUMENTS

DE  1206129 B  12/1965

(Continued)

*Primary Examiner* — Charles E Cooley

(74) *Attorney, Agent, or Firm* — Stetina Brunda Garred & Brucker; Lowell Anderson

(57) ABSTRACT

A mixer apparatus comprising a pair of counter rotating beater blades operating in a rotating bowl for the mixing of food ingredients, in which at least one of the beater blades is provided with inserts which urge small quantities of the food ingredients from a thin distributed layer into a mixable concentration of the ingredients.

17 Claims, 5 Drawing Sheets

U.S. PATENT DOCUMENTS

| | | | | |
|---|---|---|---|---|
| 2,181,078 | A * | 11/1939 | Dehuff | 366/309 |
| 2,318,534 | A * | 5/1943 | Seybert | 366/312 |
| 2,552,972 | A * | 5/1951 | Jepson | 366/222 |
| 2,599,070 | A * | 6/1952 | Schwaneke | 416/122 |
| 2,615,690 | A * | 10/1952 | Jepson | 366/197 |
| 2,699,925 | A * | 1/1955 | Madl | 416/122 |
| 2,726,851 | A * | 12/1955 | Krupp et al. | 366/147 |
| 2,747,845 | A * | 5/1956 | Kohls et al. | 416/76 |
| 2,817,503 | A * | 12/1957 | Hahn | 416/122 |
| 2,864,595 | A * | 12/1958 | Yohe | 366/300 |
| 3,005,399 | A * | 10/1961 | Libson | 99/348 |
| 3,118,165 | A * | 1/1964 | Meyerhoefer | 15/402 |
| 3,415,497 | A * | 12/1968 | Johnson | 366/247 |
| 3,544,081 | A * | 12/1970 | Eckhardt | 366/313 |
| 3,583,176 | A * | 6/1971 | Gordy | 62/342 |
| 3,656,718 | A * | 4/1972 | Cairelli | 366/200 |
| 3,730,486 | A * | 5/1973 | Hayashi et al. | 366/149 |
| 3,914,956 | A * | 10/1975 | Knight, Jr. | 62/343 |
| 4,095,307 | A * | 6/1978 | Brubaker | 15/246.5 |
| 4,197,018 | A * | 4/1980 | Groen, Jr. | 366/248 |
| 4,312,596 | A | 1/1982 | Maezawa et al. | |
| 4,571,090 | A * | 2/1986 | Weetman et al. | 366/270 |
| 4,775,239 | A * | 10/1988 | Martinek et al. | 366/2 |
| 4,790,667 | A * | 12/1988 | Pardo et al. | 366/311 |
| 4,946,285 | A * | 8/1990 | Vennemeyer | 366/288 |
| 5,074,125 | A * | 12/1991 | Schifferly | 62/342 |
| 5,249,861 | A * | 10/1993 | Thomson | 366/194 |
| 5,354,129 | A | 10/1994 | Yowell | |
| 5,615,951 | A | 4/1997 | Gabriele | |
| 5,835,827 | A * | 11/1998 | Kishimoto | 399/254 |
| 6,663,274 | B1 * | 12/2003 | Rattenberger et al. | 366/129 |
| 6,932,503 | B2 * | 8/2005 | Fallowes | 366/309 |
| 6,994,465 | B2 * | 2/2006 | Tague et al. | 366/139 |
| 7,314,308 | B2 * | 1/2008 | Fallowes et al. | 366/310 |
| 2002/0051405 | A1 * | 5/2002 | Juriga et al. | 366/129 |
| 2004/0120218 | A1 * | 6/2004 | Donthnier et al. | 366/309 |
| 2006/0171251 | A1 * | 8/2006 | Busick | 366/312 |
| 2006/0268659 | A1 * | 11/2006 | Kaas | 366/312 |
| 2007/0064523 | A1 * | 3/2007 | Wilson | 366/301 |

FOREIGN PATENT DOCUMENTS

| | | | |
|---|---|---|---|
| DE | 4239252 | A | 2/1994 |
| DE | 4239252 | A | 4/1997 |
| EP | 57673 | B | 8/1982 |
| FR | 2768607 | A | 3/1999 |
| GB | 722310 | * | 1/1955 |
| GB | 2081115 | A | 2/1982 |
| GB | 722310 | A | 1/1995 |
| JP | 11347390 | A | 12/1999 |

* cited by examiner

FOOD MIXER BLADES WITH INSERTS

RELATED APPLICATIONS

The present application is a continuation of PCT/AU2005/000398 filed on Mar. 22, 2005, which claims priority to an Australian provisional application no AU2004/901553 filed on Mar. 24, 2004.

The present invention relates to electric domestic kitchen food ingredient mixers and, more particularly to beater elements for use in such mixers.

BACKGROUND

Domestic kitchen food mixers generally use one of two different mechanisms for mixing ingredients; either two counter rotating beaters that are in a fixed position operating in a rotating bowl, or a single rotating orbital beater traveling around in a fixed bowl. The present invention relates to the former of these.

Two counter rotating beaters in a rotating bowl provide a very strong mixing action largely contained between the two beaters. Rotation of the bowl in this type of mixer is essential for effective mixing and bowls are therefore positioned on a turntable. Rotation may be induced either by directly driving the turntable or by relying on the friction of the rotating ingredients with the inside surface of the bowl. This is sometimes augmented by the provision of a small plastic button at the base of the outer beater, the rotation of the button with the beater assisting in rotating the bowl. This reliance on friction with or without an assisting button is only partially effective and, particularly with heavy mixtures the bowl may stop rotating which may in some cases even cause the bowl to be ejected from the turntable.

The rotating bowl allows for all ingredients to pass through the beaters which are positioned off centre and cover only about 25% of the bowl bottom at any one time. They are positioned in this way both to allow for the addition of ingredients while the mixing action is in progress and to allow the outer beater to scrape the inside surface of the bowl so as to incorporate unmixed material. Also it is often desirable to use a spatula to aid in the scraping of material from the inside of the bowl which the outer beater has been unable to remove.

A disadvantage of this type of mixer is that large and small quantities of ingredients cannot properly be mixed in the same size bowl so that normally at least two bowls are provided. A very small quantity, such as one egg white, for example can only be mixed in conventional mixers by use of a small bowl. In a large bowl, the small quantity spreads to cover the large bowl bottom and is then missed by the beaters which pass over the top.

In a small bowl however, the mixture is deep enough for the beaters to effectively "pick up" the ingredients and begin the process of mixing. But a disadvantage of a small bowl is that the adding of ingredients is restricted by the beaters which then occupy a large proportion of the bowl opening and which also prevent or render risky the introduction of a spatula for scraping the inside of the bowl.

There are further disadvantages in a two bowl system, including an increase in cost and of storage requirements. Also many recipes require that a mixture be started in a small bowl for later transfer to a large bowl with the associated inconvenience of extra work and additional cleaning up after use. To effectively position a bowl so that the fixed outer beater is adjacent the inner surface of the bowl requires that different size bowls be positioned on different rotational centres relative to the beaters. When the bowl is mechanically driven, providing two rotational centres becomes very complex and expensive.

Some mixers which do use a single bowl have generally compromised performance on small volume mixes or have restricted the bowl size to the extent that the mixer is unsuitable for large mixes. Other attempts to overcome the problems associated with small quantities have used a small diameter but deeper bowl. While this does allow a larger volume of ingredients it has the disadvantage of raising the height of the mixer and restricting access to the bowl for the addition of ingredients and the introduction of a scraping spatula.

Conventional mixers are considered to be of limited effectiveness in duplicating the mixing action traditionally provided by a manual whisk type beater. Beating eggs and other light materials requiring strong mixing by hand was, and may still be carried out with a beater made of a number of looped flexible wires attached to a handle which is rapidly passed through the mixture. Although the usual four blades of each of a pair of mixer beaters electrically driven at high speed appear to do a satisfactory job, there is a perception in the market place that an electric mixer needs some form of wire whisk type beater for light mixing.

It is an object of the present invention to address or at least ameliorate some of the above disadvantages.

BRIEF DESCRIPTION OF INVENTION

Accordingly there is provided in one broad form of the invention a mixer apparatus comprising a pair of counter rotating beater elements operating in a rotating bowl for the mixing of food ingredients; at least one of said beater elements provided with urging means adapted to urging small quantities of said food ingredients from a thin distributed layer into a mixable concentration of said ingredients.

Preferably said urging means comprise paddle elements located at the lower end of at least one of said beater elements.

Preferably said beater elements include at least an outer beater element and an inner beater element.

Preferably each of said pair of beater elements comprises a support shaft and a plurality of radially disposed blade elements.

Preferably each of said plurality of blade elements is formed of strip material shaped to form a generally outwardly projecting loop attached to the lower end of said supporting shaft at a first end and interconnected at a second end of said loop.

Preferably said plurality of blade elements comprises four equispaced blade elements.

Preferably said paddle elements project downwardly from at least two of said blade elements.

Preferably said paddle elements are comprised of non-abrasive inserts retained in slots provided in said blade elements.

Preferably said paddle elements are urged into contact with the base of said mixing bowl when said pair or beater elements are positioned within said mixing bowl for use.

Preferably said paddle elements are maintained in contact with said base by means of downwardly urging said support shaft by spring means acting on the upper end of said shaft.

Preferably said outer beater element is proximate to the inside surface of the side of said mixing bowl.

Preferably said inner beater element is proximate to the centre of said mixing bowl; said outer beater element and said inner beater element arranged so as to have overlapping envelopes of rotation.

Preferably said mixable concentration of said ingredients is formed substantially in an area adjacent to the inside surface of the side of said bowl and substantially within said envelopes of rotation.

Preferably each of said blade elements is provided with a slot extending for a portion of the generally vertical portions of said loop; edges of said slot adapted to provide additional mixing effect for light liquid food ingredients.

Preferably a portion of said strip material on a first side of said slot is displaced inwardly relative to the second side.

In a further broad form of the invention there is provided a method for the mixing in a large bowl of a food ingredients mixer small quantities of said food ingredients; said method including the steps of:
(a) providing the inner beater element of a pair of counter rotating beater elements with downwardly projecting paddle elements,
(b) providing downward urging means to said inner beater element so as to maintain contact between said projecting paddle elements and the base of said bowl.

In yet a further broad form of the invention there is provided a method for mixing of thin liquid food ingredients in a large bowl of a food ingredients mixer; said method including the steps of:
(a) providing slots in generally vertical portions of beater element blades made of thin strip material, Preferably said thin strip material on a first side of said slots is deformed inwardly relative to said thin strip material on the second side of said slots.

BRIEF DESCRIPTION OF DRAWINGS

Embodiments of the present invention will now be described with reference to the accompanying drawings wherein.

DETAILED DESCRIPTION OF PREFERRED EMBODIMENTS

Figure 1:
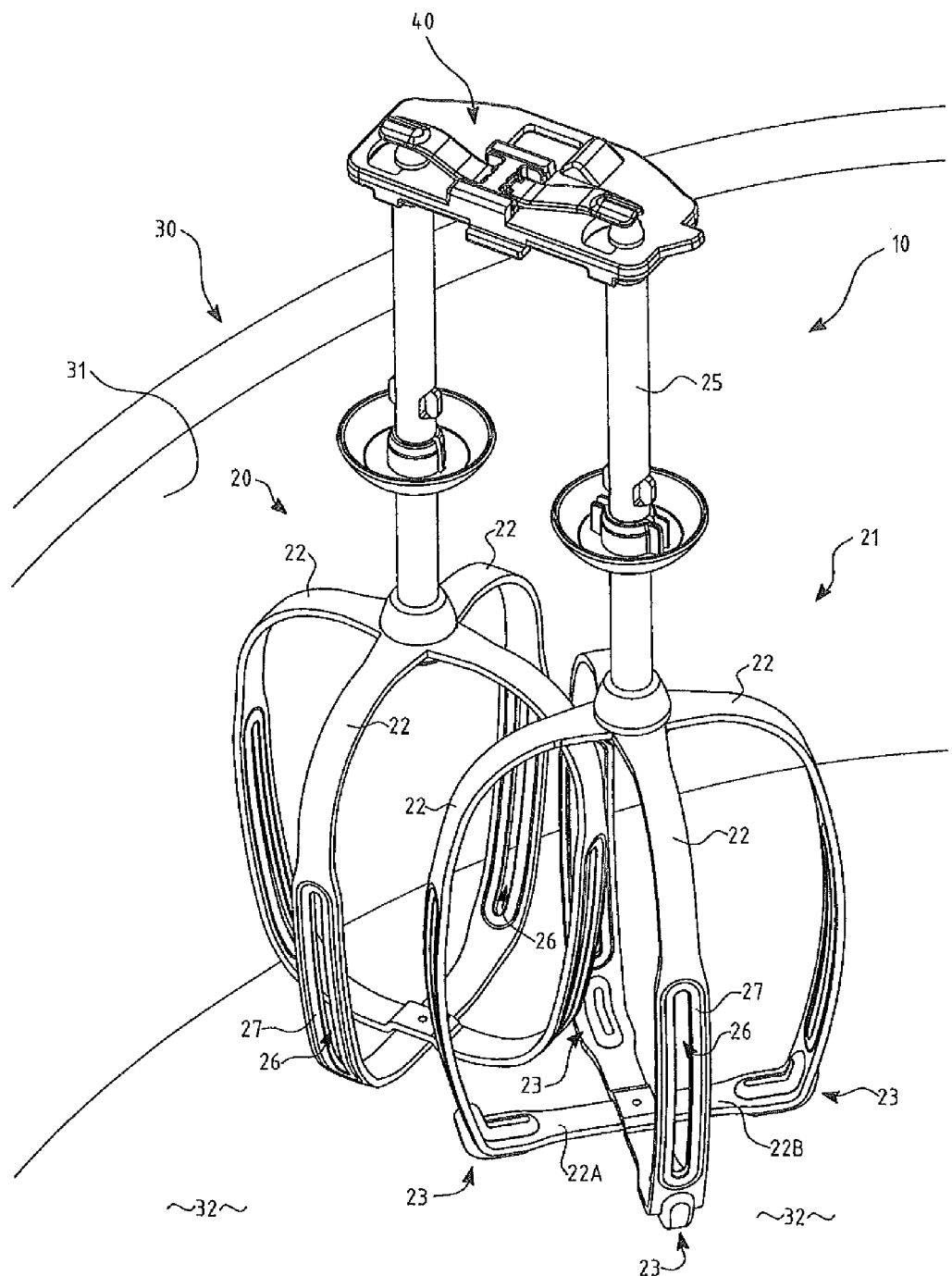
FIG. 1 is a perspective view of a pair of beater elements in a mixing bowl as viewed from above according to a first preferred embodiment of the invention.

In a first preferred embodiment of the present invention as shown in FIG. 1, a pair of beater elements 10 positioned in a mixing bowl 30 are conventionally driven in counter rotating motion by an electric motor and suitable gearing (not shown). Mixing bowl 30 is positioned on a turntable 40 as may be seen in FIG. 3 which is also driven to rotate by conventional means (not shown).

Figure 2:
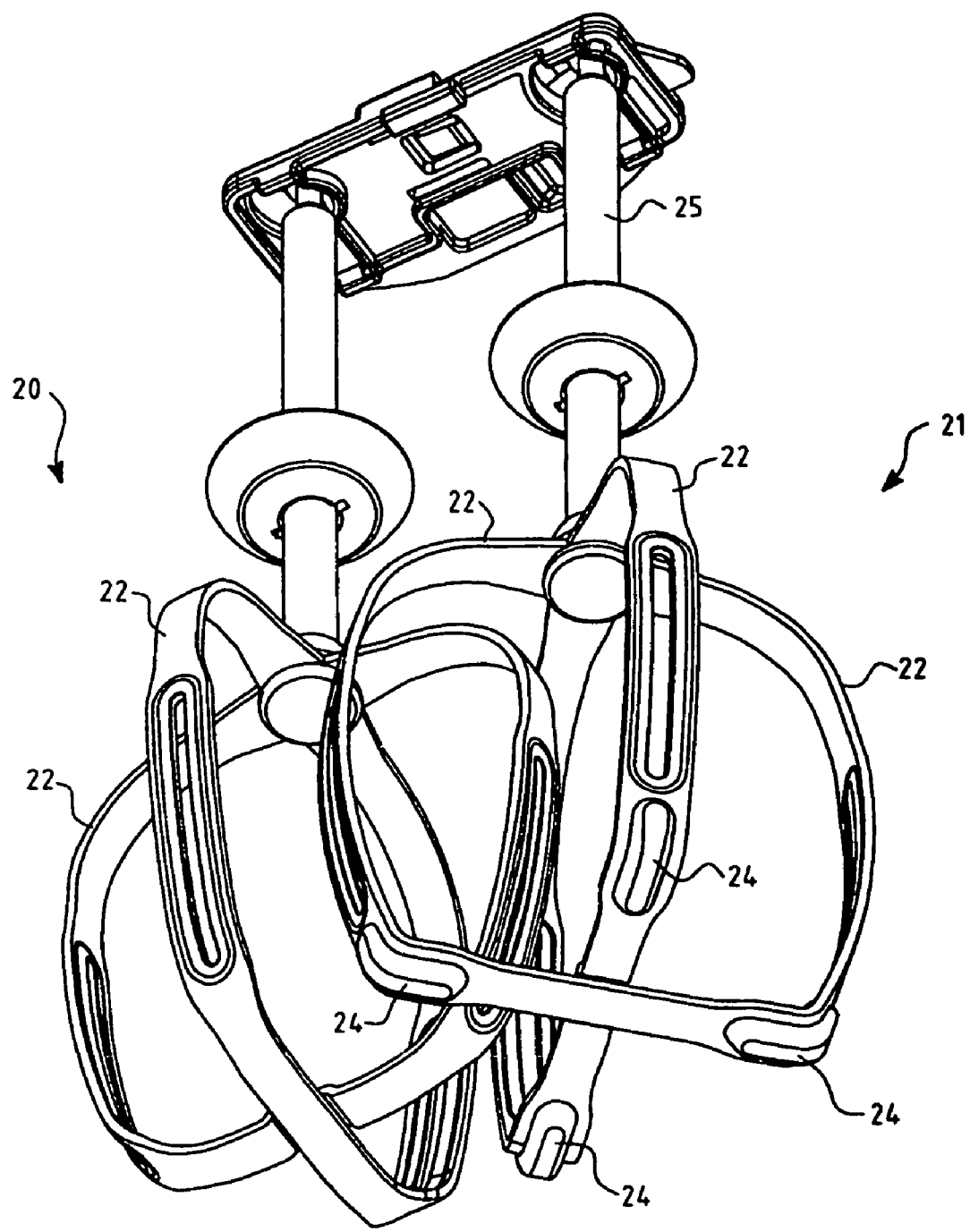
FIG. 2 is a perspective view of the pair of beater elements of FIG. 1 as viewed from below.

The pair of beaters 10 is comprised of outer beater 20 and inner beater 21. Each of outer beater 20 and inner beater 21 comprises at least four radially disposed mixing blades 22 formed as loops of relatively thin strip material as shown in FIGS. 1 and 2. The blades are so arranged and controlled by the beater rotation mechanism that respective blades 22 of the pair of beaters 10 mesh while rotating but without making contact with one another.

Figure 3:
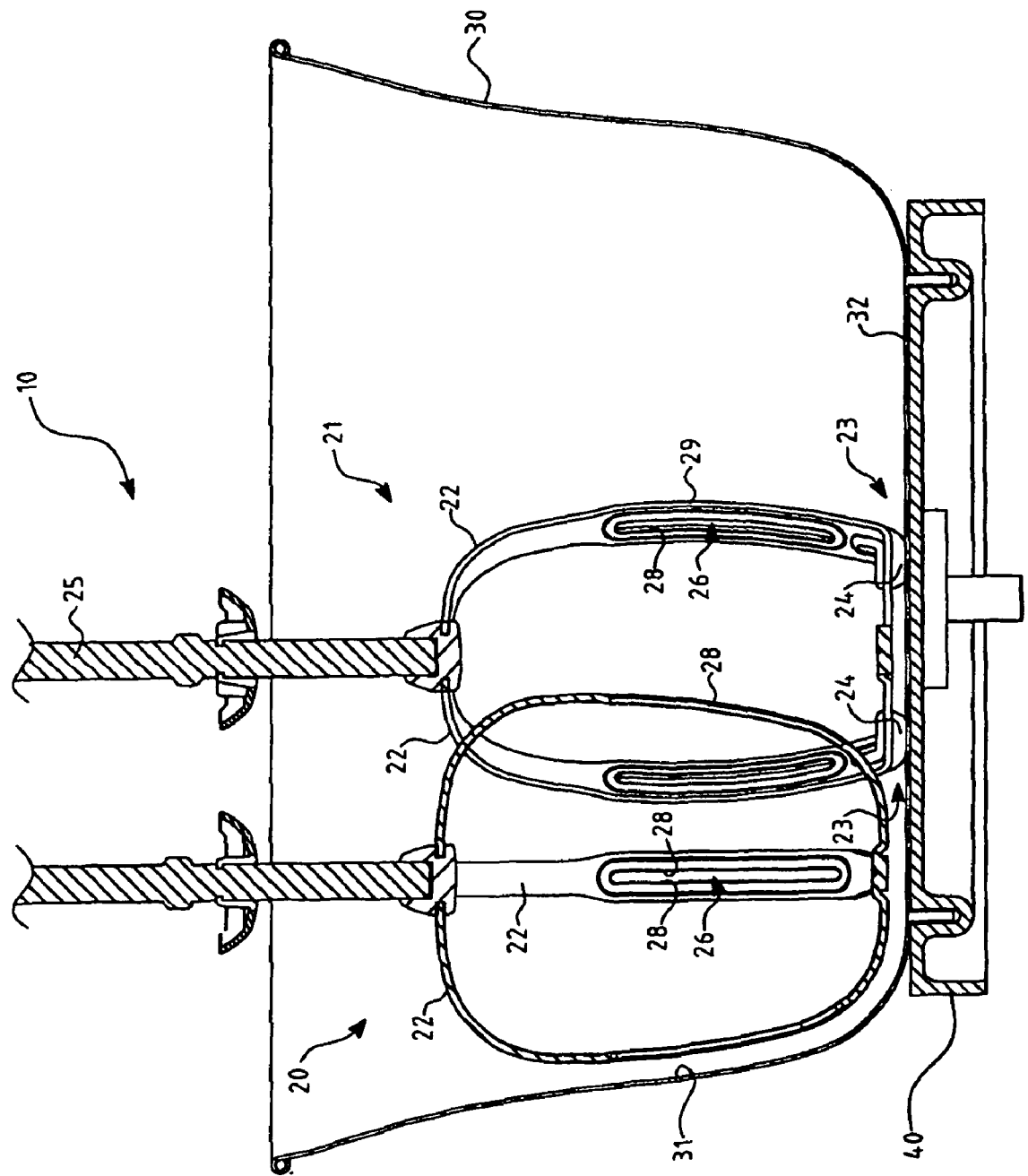
FIG. 3 is a sectioned side elevation view of the pair of beaters of FIGS. 1 and 2 in a mixing bowl placed on a turntable.

Outer beater 20 is positioned so as to leave a minimal gap between its rotational envelope and the inside surface 31 of mixing bowl 30 as may best be seen in FIG. 3.

Preferably, though not essentially, both outer beater 20 and inner beater 21 lie on a line extending radially from the centre of mixing bowl 30, with inner beater 21 approximately positioned at the centre of the bowl. In at least one preferred form of the invention the overlapping rotational envelopes thus formed by the rotating beaters cover an area of the bottom 32 of mixing bowl 30 in the range of 20 to 30 percent.

The pair of beater elements 10 is adapted to operate in a substantially flat-bottomed bowl 30 and outer beater 20 and inner beater 21 are in at least one preferred form of the invention of substantially similar construction and dimensions. However at least one pair of opposing blades 22A and 22B of inner beater 21 is provided with non-abrading inserts 23 forming downwardly projecting paddle elements 24. Preferably inserts 23 are of a hard-wearing but non-abrasive plastic and are retained after insertion into slots provided for the purpose by, for example, heat staking.

The pair of beater elements 10 is conventionally retained in a mixer head (not shown) which may be pivotally rotated between a first position in which the beaters are raised above the mixing bowl rim and a second, operating position, in which the outer and inner beater are generally vertically depending within the bowl. The lower portions 24 of inserts 23 are urged to maintain contact with the bottom 32 of mixing bowl 30 by the downward spring-loading 40 of beater shaft 25 of inner beater 21 when the beaters are in the second operating position. Outer beater 20 is so arranged as to make no contact with any part of the inside of mixing bowl 30.

The function of downwardly projecting paddle elements 24 when the mixer is in use for mixing small quantities of ingredients, is to urge those ingredients outwardly towards the inside surface 31 of mixing bowl 30. Instead or remaining in a thin layer spread across the extent of the base of the mixing bowl with the beaters rotating ineffectually above, the ingredients tend to concentrate towards the inside surface of the side of the bowl. Thus they are continually being urged into the overlapping portions of the lower parts of the rotational envelopes of both inner and outer beaters. By this means quite small quantities of ingredients may be mixed efficiently in a relatively large size mixing bowl thereby allowing a single bowl to serve for a full range of quantities of ingredients and recipe specified mixing requirements.

The blades 22 of both outer and inner beaters 20 and 21 may be provided with slots 26 extending at least along a widened portion of the substantially vertical portion of blades 22. As may best be seen in FIG. 1, in at least one preferred form slots 26 are located in deformed portions 27 so that the edges 28 of slots 26 do not lie in the same cylinder of rotation as the strip material forming the blade in the region of the slot and thus do not follow the same rotational path of the outer edges 29.

The provision of slots 26 effectively doubles the number of edges passing through the ingredients placed in the mixing bowl. This is of particular benefit in the mixing of light material where the action of the blades so provided significantly reduces the time required to stiffen material such as egg white and cream for example.

Figure 4:
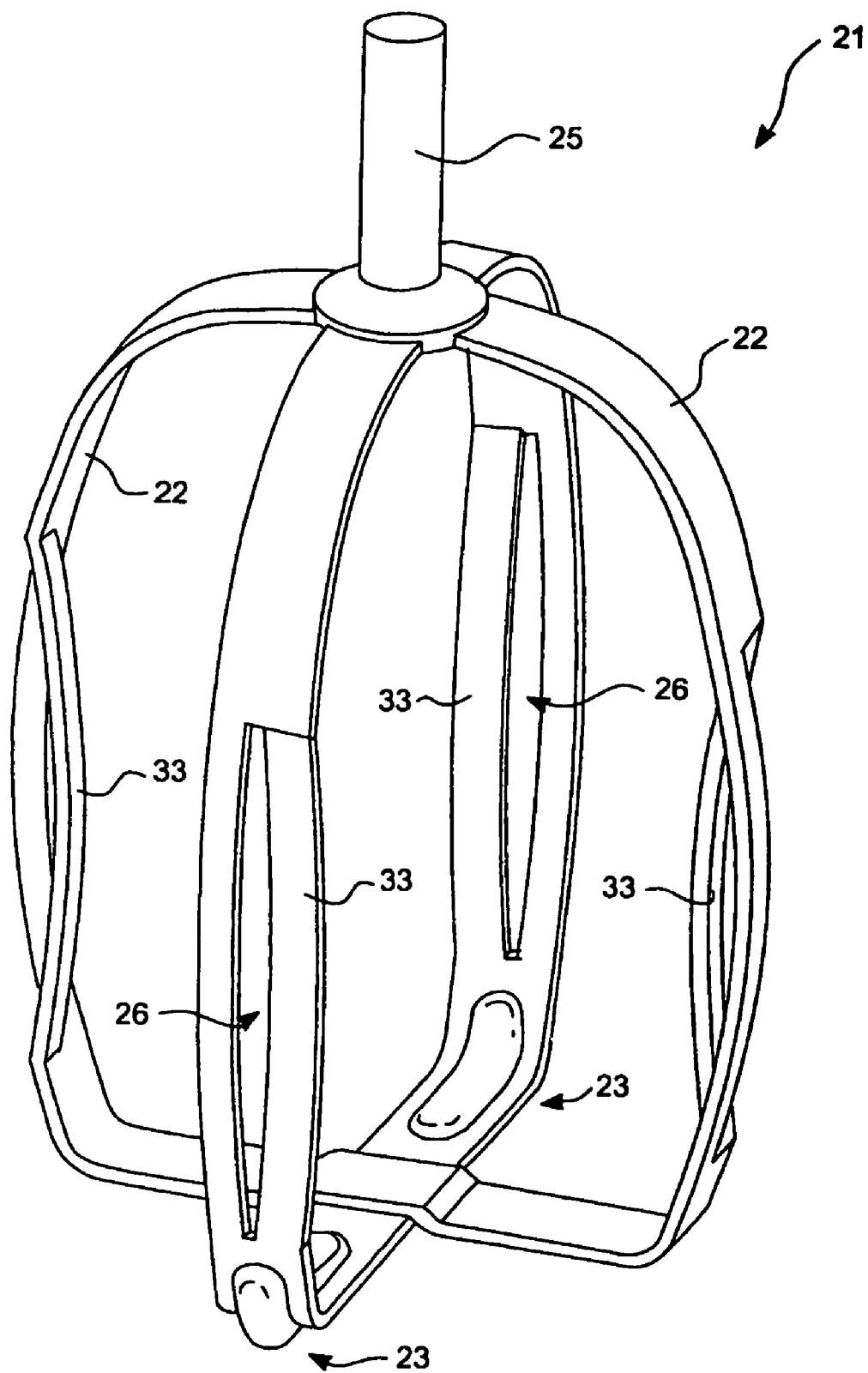
FIG. 4 is a perspective view of an inner beater element according to a further preferred embodiment of the invention.

In a further preferred embodiment of a beater element as shown in FIG. 4 the strip material forming blades 22 is again provided with a slot 26, but the strip on one side of the slot is deformed inwardly to form a bowed portion 33. This arrangement also provides for a doubling of the edges passing through the ingredients.

Figure 5:
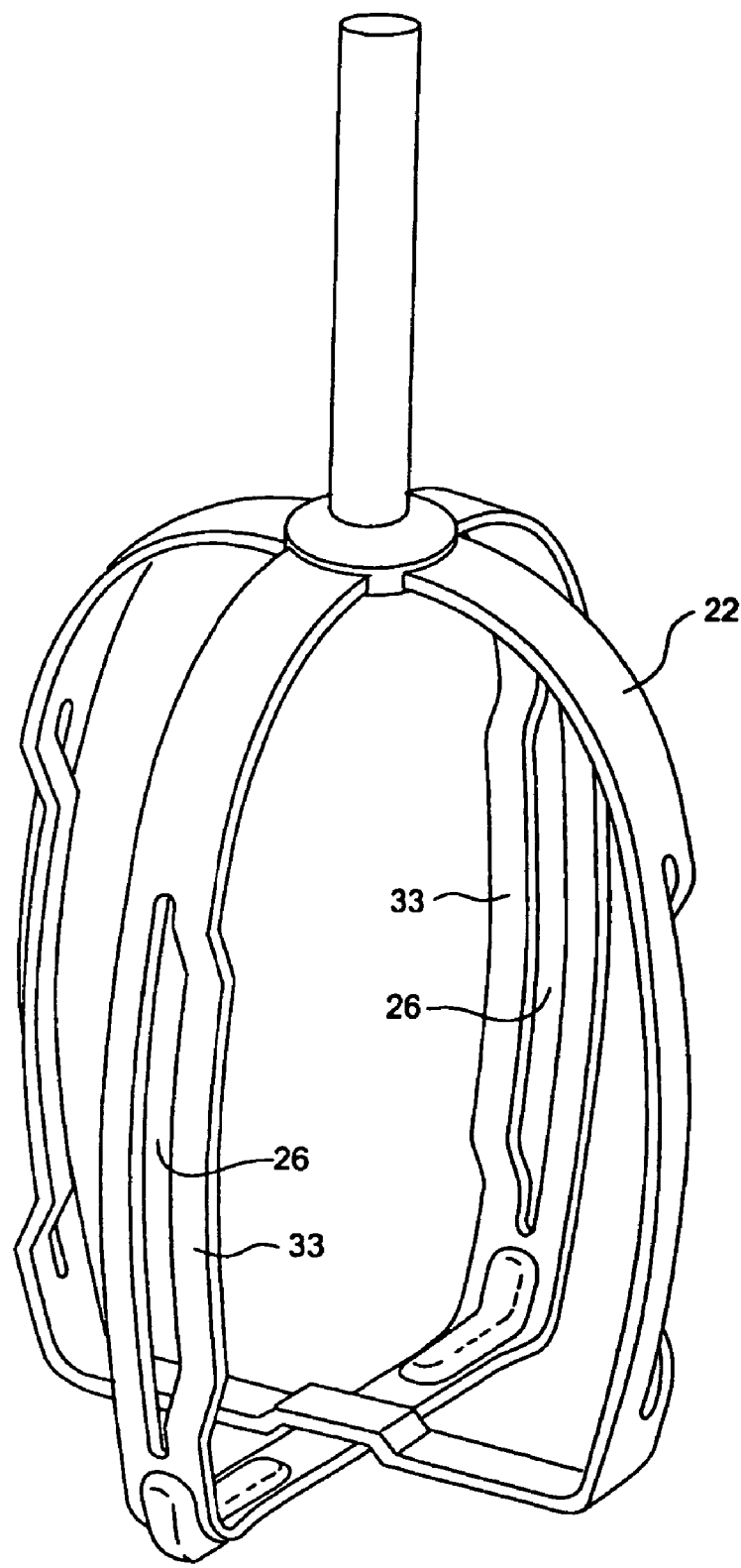
FIG. 5 is a perspective view of an inner beater element according to yet a further preferred embodiment of the invention.

In yet a further embodiment of a beater element as shown in FIG. 5 a similar doubling of edges is effected also by the provision of slots 26 and the deformation of the strip material on one side of the slot in such a way that the greater part of the portion conforms to the shape of the strip material on the other side of the slot but is offset radially and inwardly from it.

The above describes only some embodiments of the present invention and modifications, obvious to those skilled in the art, can be made thereto without departing from the scope and spirit of the present invention.

The invention claimed is:

1. A mixer apparatus operating in a rotating bowl for the mixing of food ingredients the apparatus including: a pair of counter rotating beater elements; an outer beater element and an inner beater element; said outer beater element and said inner beater element meshing while rotating without making contact one with another; each said outer beater element and said inner beater element including two pairs of juxtaposed beater blade elements; said beater blade elements comprising strips of material shaped to form generally outwardly projecting loops attached at their first ends to respective lower ends of supporting shafts of said beater elements and interconnected at their second ends; characterized in that said apparatus includes beater blade elements of at least one of said beater elements having a non abrading insert inserted into each opposing beater blade element of at least one of said juxtaposed beater blade elements; each said non abrading insert inserted at a point intermediate said supporting shaft and said interconnected second ends; said apparatus further comprising spring means acting on the upper end of a said supporting shaft of said at least one beater element so as to urge said inserts into contact with a base portion of said rotating bowl; said inserts adapted to urge small quantities of said food ingredients from a thin distributed layer of said food elements spread across the base portion of said bowl during use into a mixable concentration of said ingredients.

2. The mixer apparatus of claim 1 wherein said inserts are located at the lower end of at least one of said beater elements.

3. The mixer apparatus of claim 1 wherein said beater elements include at least an outer beater element and an inner beater element.

4. The mixer apparatus of claim 3 wherein said outer beater element is proximate to the inside surface of the side of said mixing bowl.

5. The mixer apparatus of claim 3 wherein said inner beater element is proximate to the centre of said mixing bowl; said outer beater element and said inner beater element arranged so as to have overlapping envelopes of rotation.

6. The mixer apparatus of claim 5 wherein said mixable concentration of said ingredients is formed substantially in an area adjacent to the inside surface of the side of said bowl and substantially within said envelopes of rotation.

7. The mixer apparatus of claim 1 wherein each of said plurality of blade elements is formed of strip material shaped to form a generally outwardly projecting loop attached to the lower end of said supporting shaft at a first end and interconnected at a second end of said loop.

8. The mixer apparatus of claim 1 wherein said plurality of blade elements comprises four equispaced blade elements.

9. The mixer apparatus of claim 1 wherein each of said blade elements is provided with a slot extending for a portion of generally vertical portions of said open loop of strip of material; edges of said slot adapted to provide additional mixing effect for light liquid food ingredients.

10. The mixer apparatus of claim 9 wherein a portion of said strip of material on a first side of said slot is displaced inwardly relative to a second side.

11. The mixer apparatus of claim 1, wherein the each insert is retained in a separate slot formed in said blade element in which the insert is inserted.

12. The mixer apparatus of claim 1, wherein the each insert is retained in a separate slot formed in said blade element in which the insert is inserted, and each insert forms and encircles an elongated slot extending through the blade element in which the insert is inserted.

13. The mixer apparatus of claim 1, wherein at least two opposing blade elements each has a bottom portion adjacent said first end and said supporting shaft and a side portion extending along a length of said supporting shaft with the bottom portion and side portion joined at a curve, with the non abrading insert extending along the curve and part of the bottom portion and side portion.

14. The mixer apparatus of claim 13, further comprising a slot in two opposing side portions, with a further non abrasive insert in each of said two slots.

15. The mixer apparatus of claim 13, further comprising a slot in two opposing side portions, each slot having a first side and an opposing second side, with the first side of said slot displaced inwardly relative to the non abrading material on the second side of said slot.

16. The mixer apparatus of claim 1, wherein at least two opposing blade elements each has a generally horizontal bottom portion adjacent said first end and said supporting shaft and a side portion extending along a length of said supporting shaft with the bottom portion and side portion joined at a curve, with the non abrading insert extending into the bottom portion.

17. The mixer apparatus of claim 16, wherein the non abrading insert forms an elongated opening along a middle of the insert.

* * * * *